United States Patent Office 2,821,531
Patented Jan. 28, 1958

2,821,531

PREPARATION OF 3-ACYL-6-SUBSTITUTED Δ⁶-DESOXYMORPHINE

Horace D. Brown, Plainfield, N. J., assignor to Merck & Co., Inc., Rahway, N. J., a corporation of New Jersey No Drawing. Application June 2, 1953
Serial No. 359,207

6 Claims. (Cl. 260—285)

This invention is concerned generally with novel processes for preparing morphine derivatives. More particularly, it relates to improved processes for preparing Δ⁶-desoxymorphine compounds having a lower alkyl or aryl substituent attached to the carbon atom in the 6-position of the molecule, to the lower alkanoyl esters of said compounds, and acid salts thereof, compounds which possess superior analgesic activity, and to novel intermediates produced in the process of preparing these analgesic substances.

The 6-alkyl-Δ⁶-desoxymorphines, 6-aryl-Δ⁶-desoxymorphines, their lower alkanoyl esters, and salts thereof, may be chemically represented by the following structural formulae:

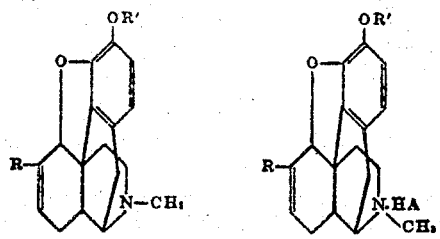

wherein R is a lower alkyl or aryl substituent, R' is hydrogen or a lower alkanoyl radical, and HA is an acid.

The chemical relationship of the 6-alkyl-Δ⁶-desoxymorphine, and their esters, to morphine is clear from a comparison of the foregoing formulae with the structural formula of morphine which is as follows:

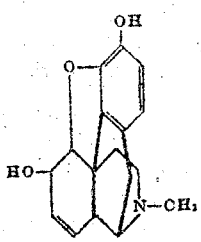

Although the alkaloid morphine has for centuries been known to possess analgesic activity, the contribution of each and every characteristic portion of this complex molecule to the analgesic and narcotic properties is still not fully understood. Extensive research has established the chemical structure of this important narcotic, and has given some indications as to the effect of certain structural characteristics on analgesic activity. There is no way known, however, for predicting the pharmacological properties of derivatives prepared by introducing new substituents at various points in the morphine nucleus. The 6-alkyl-Δ⁶-desoxymorphines, and their lower alkanoyl esters, and salts, have been found very much more active than morphine. For example, 6-methyl-Δ⁶-desoxymorphine has been found to possess over one hundred times the analgesic activity possessed by morphine itself. Moreover, 6-methyl-Δ⁶-desoxymorphine possesses, in addition to its extremely high potency, an extraordinary promptness of onset of analgesic action.

An improved synthesis of Δ⁶-desoxymorphine compounds having a lower alkyl or aryl substituent attached to the carbon atom in the 6-position of the molecule was desired, since the processes originally developed involved prolonged periods of heating at elevated temperatures and pressures with large excesses of the reactants.

A vastly improved procedure for the preparation of these valuable compounds has now been developed which greatly increases the yield of the product and simplifies operation conditions considerably.

Regarded in certain of its broader aspects, the process of the present invention involves esterification of the phenolic hydroxyl group of a 6-alkyl or 6-aryl-dihydromorphine to form 3-acyloxy-6-alkyl-dihydromorphine or 3-acyloxy-6-aryl-dihydromorphine, dehydration of the ester to produce 3-acyloxy-6-alkyl-Δ⁶-desoxymorphine or 3-acyloxy-6-aryl-Δ⁶-desoxymorphine compounds and hydrolysis of the latter compounds to form the desired 6-alkyl-Δ⁶-desoxymorphine or 6-aryl-Δ⁶-desoxymorphine. This process can be chemically represented as follows:

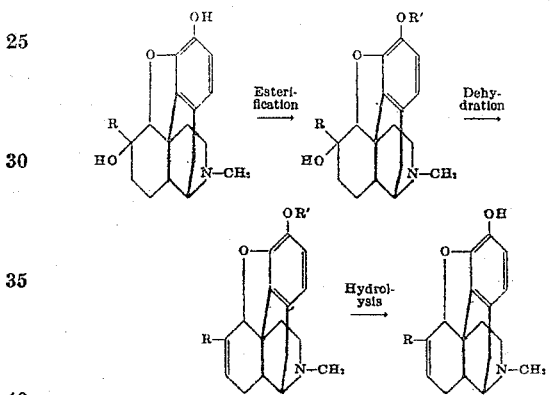

wherein R represents an alkyl or aryl radical and R' represents an acyl radical. The term "acyl" as used throughout the specification and claims includes the residue of a carboxylic acid, such as acetyl, as well as carboalkoxy and carboaralkoxy.

The 6-alkyl-dihydromorphine or 6-aryl-dihydromorphine compounds employed as starting materials in the process of this invention are conveniently prepared by reacting dihydromorphine with an ethereal solution of an alkyl lithium or an aryl lithium such as methyl lithium, ethyl lithium, propyl lithium, butyl lithium, phenyl lithium, and the like, thereby forming the corresponding 6-alkyl-dihydromorphine or 6-aryl-dihydromorphine, such as 6-methyl-dihydromorphine, 6-ethyl-dihydromorphine, 6-propyl-dihydromorphine, 6-butyl-dihydromorphine, 6-phenyl-dihydromorphine and the like.

Esterification of the 3-hydroxyl group of 6-alkyl-dihydromorphine or 6-aryl-dihydromorphine is accomplished by reacting the 6-alkyl-dihydromorphine or 6-aryl-dihydromorphine compound with an organic esterifying agent such as an organic acid halide or an organic acid anhydride. Examples of the esterifying agents which can be employed satisfactorily in the process of this invention are aliphatic and aromatic acid anhydrides and halides as well as carboalkoxy and carboaralkoxy halides. Some of the specific compounds which have served as esterifying agents are acetyl chloride, carboethoxy chloride, carbobenzoxy chloride, and acetic anhydride. Excess amounts of the esterifying agent may be used in the process without adversely affecting the yield of the esterified product. In fact, if the esterifying agent is a liquid, it may be used in excess to replace the solvent which would ordinarily be employed during the reaction. The preferred esterifying agents are acetic anhydride or carboalkoxy chloride.

Although pyridine is the solvent of choice for the esterification, other solvents such as water or organic solvents having no reactive hydrogen atoms can be employed efficiently in this process. Examples of the solvents that can be used are aliphatic, alicyclic, and aromatic hydrocarbons, halogenated hydrocarbons, ethers, ketones and tertiary amines, such as toluene, chloroform, dioxane, and N-ethyl piperidine.

It is generally preferred to conduct the reaction of the 6-alkyl-dihydromorphine or 6-aryl-dihydromorphine with an esterifying agent in the presence of an acid binding agent, thus neutralizing the acid formed during the reaction and increasing the yield of the ester. The basic material used may be an alkali or alkaline earth metal oxide, hydroxide, carbonate and bicarbonate or an organic tertiary amine. The preferred acid binding agent is pyridine.

It is convenient to carry out the esterification at approximately room temperature or slightly above room temperature for a period of about six to twenty-four hours although higher temperatures may be employed with resultant shortening of the time cycle.

If desired, the reaction product, a 3-acyloxy-6-alkyl-dihydromorphine or 3-acyloxy-6-aryl-dihydromorphine, may be purified by extraction into a solvent immiscible with the reaction mixture, and subsequently crystallized by trituration with ether.

The dehydration of the 3-acyloxy-6-alkyl-dihydromorphine or 3-acyloxy-6-aryl-dihydromorphine to form the 3-acyloxy-6-alkyl-$\Delta^6$-desoxymorphine or 3-acyloxy-6-aryl-$\Delta^6$-desoxymorphine can be carried out utilizing as the dehydrating agent one of the phosphorus, sulfur, or acyl halides. Examples of suitable dehydrating agents include compounds such as phosphorus tribromide, phosphorus trichloride, thionyl chloride, thionyl bromide, phosphorus pentachloride, sulfuryl chloride, sulfuryl bromide and acetyl chloride.

The dehydration reaction can be carried out in the presence of any of the solvents previously mentioned as suitable for the esterification reaction. When pyridine is employed as solvent, the reaction is conveniently run at room temperature, although when solvents other than pyridine are used, slightly higher temperatures are preferred; for example, when chloroform is employed the mixture is held at reflux temperature for approximately eighteen hours. The temperature and the length of reaction time are dependent upon each other and on the choice of solvent. It is possible to carry out the reaction between about room temperature and 100° C. using times of from six to twenty-four hours.

It is not necessary that the 3-acyloxy-6-alkyl-dihydromorphine or 3-acyloxy-6-aryl-dihydromorphine be a pure crystalline material although the best yields are obtained when pure material is used. As an alternate method, the crude 3-acyloxy-6-alkyl-dihydromorphine or 3-acyloxy-6-aryl-dihydromorphine may be treated with the dehydrating agent without further purification. In order to further simplify the process of this invention it is possible to esterify the phenolic hydroxyl group and dehydrate at the 6-7 positions without isolation of intermediates by employing a reagent, such as acetyl chloride, which will cause both reactions to take place.

Hydrolysis of the 3-acyloxy-6-alkyl-$\Delta^6$-desoxymorphine or 3-acyloxy-6-aryl-$\Delta^6$-desoxymorphine to yield 6-alkyl-$\Delta^6$-desoxymorphine or 6-aryl-$\Delta^6$-desoxymorphine may be carried out using either acid or alkaline reagents in aqueous, anhydrous organic, or aqueous organic solvent. Alkaline hydrolysis may be conducted using alkali or alkaline earth metal oxides, hydroxides, alkoxides or carbonates and acid hydrolysis may be effected using any of the common mineral acids in dilute aqueous solution. The preferred conditions of basic hydrolysis comprise heating with alcoholic potassium hydroxide at temperatures below about 100° C. for approximately fifteen minutes. It is preferable to maintain an atmosphere of nitrogen during the alkaline hydrolysis reaction in order to minimize decomposition and achieve maximum yields. The hydrolysis may be carried out between the temperatures of 25°–125° C. over a period of from a few minutes to 24 hours.

Dilute acid hydrolysis is the normally preferred procedure since the acid addition salt of 6-methyl-$\Delta^6$-desoxymorphine may be readily isolated from the reaction mixture and the salt is the preferred form of the compound for therapeutic administration rather than the free base. Thus, following acid hydrolysis of the 3-acyloxy-6-alkyl-$\Delta^6$-desoxymorphine, the desired acid addition of 6-alkyl-$\Delta^6$-desoxymorphine may be obtained by concentrating the aqueous solution and allowing the product to crystallize. For example, 6-alkyl-$\Delta^6$-desoxymorphine or 6-aryl-$\Delta^6$-desoxymorphine acid addition salts such as the 6-alkyl-$\Delta^6$-desoxymorphine hydrochloride, 6-alkyl-$\Delta^6$-desoxymorphine sulfate, 6-alkyl-$\Delta^6$-desoxymorphine hydrobromide or 6-alkyl-$\Delta^6$-desoxymorphine phosphate may be prepared preferably by contacting the 3-acyloxy-6-alkyl-$\Delta^6$-desoxymorphine compound with a dilute aqueous solution of the appropriate mineral acid at not higher than 100° C. for approximately one to three hours. The 6-aryl-$\Delta^6$-desoxymorphine addition salts may be prepared in like manner. Although the elevated temperature may be necessary to effect ester hydrolysis, the formation of the acid addition salt takes place readily at room temperature.

The following examples illustrate a method of carrying out the present invention, but it is to be understood that these examples are given primarily by way of illustration and not of limitation.

EXAMPLE 1

*Preparation of 3-carbomethoxy-6-methyl-dihydromorphine*

Eleven grams of 6-methyl-dihydromorphine (which can be prepared as set forth hereinbelow) was dissolved in 80 ml. of dry pyridine. To this mixture was added dropwise 7 ml. of methyl chlorocarbonate while cooling and stirring. After standing overnight at room temperature the solution was poured onto crushed ice and a small quantity of sodium bicarbonate solution was added. The mixture was extracted with chloroform, the extract washed with water over anhydrous sodium sulfate and concentrated in vacuo to a viscous syrup. Trituration of the syrup with a small volume of ether induced instant crystallization of 7.5 grams of 3-carbomethoxy-6-methyl-dihydromorphine having a melting point of 139°–141° C., $\alpha_D^{25} = -241°$ C. (1% absolute alcohol).

*Analysis.*—Calculated for $C_{20}H_{25}O_5N$ (350.4): C, 66.83; H, 7.01; N, 3.90. Found: C, 67.42; H, 7.13; N, 3.96.

*Preparation of 3-carbomethoxy-6-methyl-$\Delta^6$-desoxymorphine*

Three grams of 3-carbomethoxy-6-methyl-dihydromorphine was dissolved in 100 ml. of absolute chloroform and 3 ml. of thionyl chloride was added dropwise with stirring (25° C.). The colorless solution was stirred at room temperature for one hour and then refluxed for seven hours. The chloroform solution was then poured onto crushed ice and the pH of the resulting mixture was adjusted to 9 with potassium hydroxide. The mixture was then extracted with chloroform and the chloroform extract concentrated in vacuo to yield 3-carbomethoxy-6-methyl-$\Delta^6$-desoxymorphine.

*Preparation of 6-methyl-$\Delta^6$-desoxymorphine*

The 3-carbomethoxy-6-methyl-$\Delta^6$-desoxymorphine was dissolved in 50 ml. of 95% alcohol and 2 grams of potassium hydroxide and a small volume of water was added. After refluxing the solution for 30 minutes in a nitrogen atmosphere, the pH of the mixture was adjusted to 9. The alcohol was removed by evaporation in vacuo and the residual 6-methyl-$\Delta^6$-desoxymorphine was extracted into chloroform. The chloroform extract was dried and concentrated in vacuo. The residue was crystallized from ethyl acetate to yield 1.38 grams of 6-methyl-$\Delta^6$-desoxymorphine having a melting point of 227°–229° C., $\alpha_D^{25}=-221°$ C. (1% absolute alcohol). Recrystallization from the same solvent raised the melting point to 236–237° C. The 6-methyl-dihydromorphine, utilized as starting material in this example was prepared as follows: Thirteen and one-half grams (0.047 mole) of solid dihydromorphine were added, with stirring, over a twenty-minute period, to 107 ml. of a 1.3 molar solution of methyl-lithium in absolute ether (0.14 mole of CH$_3$Li). The resulting mixture was stirred for an additional period of forty-five minutes while maintaining the temperature of the mixture at approximately 20° C. The reaction mixture was then added to a cold dilute aqueous solution of acetic acid, and sufficient ammonium hydroxide was added to the resulting mixture to adjust the pH to approximately 9. The aqueous alkaline solution was then extracted with chloroform, and the chloroform extract was evaporated to dryness in vacuo. The residual material was recrystallized from 200 ml. of acetone to give 6-methyl-dihydromorphine; melting point 210°–211° C.

EXAMPLE 2

*Preparation of 3-carbomethoxy-6-methyl-$\Delta^6$-desoxymorphine*

A mixture of 2.4 g. of 3-carbomethoxy-6-methyl-dihydromorphine, prepared as in Example 1, 25 ml. of pyridine and 2 ml. of thionyl chloride was prepared and allowed to stand at room temperature for 24 hours. The mixture was then decomposed on ice and the pH adjusted to 8.5 with sodium bicarbonate. It was then extracted with chloroform and the chloroform extract concentrated in vacuo to an oil. The oil was then leached with 100 ml. of boiling ether, filtered, and the ethereal filtrate concentrated to give as a solid product, 3-carbomethoxy-6-methyl-$\Delta^6$-desoxymorphine, having a melting point of 135°–140° C.

*Preparation of 6-methyl-$\Delta^6$-desoxymorphine—alkaline hydrolysis*

The 3-carbomethoxy-6-methyl-$\Delta^6$-desoxymorphine was heated with 2 g. of sodium hydroxide and dissolved in aqueous alcohol for about 30 minutes. The alcohol was then removed from the mixture by evaporation under reduced pressure and the product, 6-methyl-$\Delta^6$-desoxymorphine, was extracted into chloroform and the chloroform extract concentrated to an oil. Trituration of the residual oil resulted in 1.33 g. of crystalline 6-methyl-$\Delta^6$-desoxymorphine having a melting point of 228°–232° C. The product was then recrystallized from ethyl acetate to yield a product having a melting point of 236°–237° C., $\alpha_D^{25}$ —227° C. (1% absolute alcohol).

*Analysis.*—Calculated for $C_{18}H_{21}O_2N$ (283.3): C, 76.28; H, 7.47; N, 4.94. Found: C, 76.43; H, 7.40; N, 5.14.

*Preparation of 6-methyl-$\Delta^6$-desoxymorphine—acid hydrolysis*

A mixture of 0.25 gram of 3-carbomethoxy-6-methyl-$\Delta^6$-desoxymorphine and 10 ml. of 2.5 N hydrochloric acid was warmed on a steam bath for three hours. The 6-methyl-$\Delta^6$-desoxymorphine was extracted into chloroform and the chloroform extract concentrated to an oil. The residual oil was triturated and the product recrystallized from ethyl acetate to yield 6-methyl-$\Delta^6$-desoxymorphine having a melting point of 236°–238° C.

EXAMPLE 3

*Preparation of 3-carboethoxy-6-methyl-dihydromorphine*

One and eighteen hundredths grams (0.0033 mole) of 6-methyl-dihydromorphine was dissolved in 25 ml. of dry pyridine. To this mixture was added dropwise 0.5 g. of ethyl chlorocarbonate (with cooling). A transient precipitate and slight yellow coloration were noted in the reaction mixture. After standing overnight at room temperature the solution was poured onto crushed ice and a small quantity of sodium bicarbonate solution was added. The mixture was extracted with chloroform, the extract washed with water, dried over anhydrous sodium sulfate and concentrated in vacuo to a viscous syrup. Trituration of the syrup with a small volume of ether induced instant crystallization of 3-carboethoxy-6-methyl-dihydromorphine, having a melting point of 119°–121° C. A yield of 1.3 g. was obtained. Recrystallization of 3-carboethoxy-6-methyl-dihydromorphine from ether resulted in a product having a melting point of 120°–121° C., $\alpha_D^{25}=-216°$ C. (1% absolute alcohol).

*Analysis.*—Calculated for $C_{21}H_{27}O_5N$ (373.4): C, 67.54; H, 7.28; N, 3.75. Found: C, 68.08; H, 7.26; N, 4.20.

*Preparation of 3-carboethoxy-6-methyl-$\Delta^6$-desoxymorphine*

Two and seven-tenths grams of 3-carboethoxy-6-methyl-dihydromorphine was dissolved in 100 ml. of alcohol-free chloroform and 3 ml. of thionyl chloride was added dropwise. The solution was then refluxed overnight. Addition of another small volume of thionyl chloride did not release more hydrogen chloride gas; hence, reaction was complete. The chloroform solution was then poured onto crushed ice, and the pH of the resulting mixture was adjusted to 9 with potassium hydroxide. The mixture was then extracted with chloroform and the chloroform extract concentrated in vacuo to yield 3-carboethoxy-6-methyl-$\Delta^6$-desoxymorphine.

*Preparation of 6-methyl-$\Delta^6$-desoxymorphine*

The crude 3-carboethoxy-6-methyl-$\Delta^6$-desoxymorphine obtained as described above was dissolved in 50 ml. of 95% alcohol and 1 g. of potassium hydroxide and a small volume of water was added. After refluxing the solution for 30 minutes in a nitrogen atmosphere the pH of the mixture was adjusted to 9, the alcohol was removed by evaporation in vacuo and the residual crude 6-methyl-$\Delta^6$-desoxymorphine was extracted into chloroform. The chloroform extract was dried and concentrated in vacuo. The residue was crystallized from 50 ml. of ethyl acetate to yield 1.27 g. of essentially pure 6-methyl-$\Delta^6$-desoxymorphine having a melting point of 225°–229° C., $\alpha_D^{25}=-215°$ C. (1% absolute alcohol). Concentration of the solvent and chilling yielded a second crop of 0.27 g. of 6-methyl-$\Delta^6$-desoxymorphine. Further purification raised the melting point to 235°–237° C.

*Analysis.*—Calculated for $C_{18}H_{21}O_2N$ (283.3): C, 76.28; H, 7.47; N, 4.94. Found: C, 76.31; H, 7.40; N, 4.81.

6-methyl-$\Delta^6$-desoxymorphine hydrochloride melted at 288°–289° C., $\alpha_D^{25}$—186° C. (1% absolute alcohol) and was anhydrous after crystallization from alcohol-ether and drying at 100°/1 mm.

The 6-methyl-$\Delta^6$-desoxymorphine hydrobromide decomposed at 293°–297° C., $\alpha_D^{25}$—167° C. (C=0.6, methyl alcohol).

EXAMPLE 4

*Preparation of 3-carboethoxy-6-ethyl-dihydromorphine*

One and seven-tenths grams of 6-ethyl-dihydromorphine (which can be prepared as set forth hereinbelow) was dissolved in 10 ml. of dry pyridine. To this mixture was added dropwise 1 ml. of ethyl chlorocarbonate (with cooling). After standing overnight at room temperature, the solution was poured onto crushed ice and a small quantity of sodium bicarbonate was added. The mixture was extracted with chloroform, the extract washed with water, dried over anhydrous sodium sulfate and concentrated in vacuo to a viscous syrup. The 3-carboethoxy-6-ethyl-dihydromorphine was obtained as a colorless oil which was highly soluble in organic solvents.

*Preparation of 3-carboethoxy-6-ethyl-$\Delta^6$-desoxymorphine*

The 3-carboethoxy-6-ethyl-dihydromorphine was dissolved in alcohol-free chloroform and 1 ml. of thionyl chloride was added dropwise. The solution was then refluxed for 15 hours. The chloroform solution was then poured onto crushed ice and the resulting mixture was adjusted to pH 9 with potassium hydroxide. The mixture was then extracted with chloroform and the chloroform extract concentrated in vacuo to yield 3-carboethoxy-6-ethyl-$\Delta^6$-desoxymorphine.

*Preparation of 6-ethyl-$\Delta^6$-desoxymorphine*

The crude 3-carboethoxy-6-ethyl-$\Delta^6$-desoxymorphine was dissolved in 95% alcohol and potassium hydroxide and a small volume of water was added. After refluxing the solution for 30 minutes at 100° C. under a nitrogen atmosphere the pH of the mixture was adjusted to 9. The alcohol was removed by evaporation in vacuo and the residual crude 6-ethyl-$\Delta^6$-desoxymorphine was extracted into chloroform. The chloroform extract was dried and concentrated in vacuo. The residue was crystallized from ethyl acetate to yield 0.51 gram of 6-ethyl-$\Delta^6$-desoxymorphine, having a melting point of 119°–121° C. One further crystallization from ethyl acetate raised the melting point to 122°–124° C., $\alpha_D^{25} = -185°$ C. (1% absolute alcohol). Addition of a slight excess of alcoholic hydrogen bromide to the base gave the crystalline 6-ethyl-$\Delta^6$-desoxymorphine-hydrobromine having a melting point of 277°–284° C. (decomposed). The analytical sample was dried at 78°/1 mm.

*Analysis.*—Calculated for $C_{19}H_{24}O_2NBr$ (378.3): C, 60.32; H, 6.39. Found: C, 59.62; H, 6.13.

The 6-ethyl-dihydromorphine, utilized as starting material in this example was prepared as follows: Ten grams (0.035 mole) of dihydromorphinone was added over a twenty-minute period to 250 ml. of an ethereal solution containing 0.11 mole of ethyl lithium. The mixture was stirred at room temperature for a period of about forty-five minutes. The reaction mixture was poured into cold dilute aqueous acetic acid solution and the resulting solution made alkaline to pH 9 with ammonium hydroxide. The basic solution was evaporated with chloroform, and the chloroform evaporated from the chloroform extract to give a crude amorphous product, which, upon recrystallization from acetone, gave substantially pure 6-ethyl-dihydromorphine, melting point 212°–213° C., $$\alpha_D^{25°\,C.} = -141°\ C.$$

(ethyl alcohol).

EXAMPLE 5

*Preparation of 3-carboethoxy-6-phenyl-dihydromorphine*

Five grams of 6-phenyl-dihydromorphine (which can be prepared as set forth hereinbelow) was dissolved in 25 ml. of pyridine. To this mixture was added dropwise 3 ml. of ethyl chlorocarbonate (with cooling). After standing overnight at room temperature, the solution was poured onto crushed ice and a small volume of sodium bicarbonate solution was added. The mixture was extracted with chloroform, the extract washed with water, dried over anhydrous sodium sulfate and concentrated in vacuo to a viscous syrup. Trituration of the syrup with a small volume of ether induced instant crystallization of 3-carboethoxy-6-phenyl-dihydromorphine having a melting point of 173°–174° C. A yield of 5.08 grams was obtained. Recrystallization from boiling ether raised the melting point to 175°–176° C., $\alpha_D^{25} = -213°$ C. (1% absolute alcohol).

*Analysis.*—Calculated for $C_{26}H_{29}O_5N$: C, 71.69; H, 6.70; N, 3.22. Found: C, 71.73; H, 6.63; N, 3.24.

*Preparation of 3-carboethoxy-6-phenyl-$\Delta^6$-desoxymorphine*

The 3-carboethoxy-6-phenyl-dihydromorphine was dissolved in alcohol-free chloroform and thionyl chloride was added dropwise to this mixture. The solution was then refluxed overnight. The chloroform solution was then poured onto crushed ice and the pH of the resulting mixture was adjusted to 9 with potassium hydroxide. The mixture was then extracted with chloroform and the chloroform extract concentrated in vacuo to yield 3-carboethoxy-6-phenyl-$\Delta^6$-desoxymorphine.

*Preparation of 6-phenyl-$\Delta^6$-desoxymorphine*

One and three-tenths grams of 3-carboethoxy-6-phenyl-$\Delta^6$-desoxymorphine was dissolved in 15 ml. of 95% alcohol and 1 g. of potassium hydroxide pellets, and 2 ml. of water was added. After refluxing the solution for 30 minutes in a nitrogen atmosphere, the pH of the mixture was adjusted to 9. The alcohol was removed by evaporation in vacuo and the residual crude 6-phenyl-$\Delta^6$-desoxymorphine was extracted into chloroform. The chloroform extract was dried and concentrated in vacuo to yield 6-phenyl-$\Delta^6$-desoxymorphine. Dissolution of the residue in alcoholic hydrogen chloride yielded 6-phenyl-$\Delta^6$-desoxymorphine hydrochloride, melting point 265°–270° C. (dec.), $\alpha_D^{25} = -287°$ C. (1% absolute alcohol).

The 6-phenyl-dihydromorphine utilized as a starting material in this process was prepared as follows: 12 grams of solid dihydromorphine was added with stirring over a twenty minute period to 150 ml. (0.14 mole) of phenyl-lithium solution in absolute ether. The resulting mixture was stirred for an additional period of 45 minutes while maintaining the temperature of the mixture at approximately 20° C. The reaction mixture was then added to a cold, dilute aqueous solution of acetic acid and sufficient ammonium hydroxide was added to the resulting mixture to adjust the pH to approximately 9. The aqueous alcoholic solution was then extracted with chloroform and the chloroform extract was evaporated to dryness in vacuo. The residual material was crystallized from acetone to give 6-phenyl-dihydromorphine, having a melting point of 138°–140° C. The 6-phenyl-dihydromorphine hydrochloride $\alpha_D^{25} = -104°$ C. (0.5% in alcohol) was prepared from alcoholic hydrogen chloride and ether. The 6-phenyl-dihydromorphine hydrochloride salt had a melting point of 274°–281° C.

EXAMPLE 6

*Preparation of 3-carbobenzoxy-6-methyl-dihydromorphine*

To 1.9 g. of 6-methyl-dihydromorphine in 10 ml. of dry pyridine was added 1.2 g. of carbobenzoxy chloride in toluene solution. After standing overnight at room temperature the solution was poured on crushed ice and a small quantity of sodium bicarbonate solution was added. The mixture was extracted with chloroform, the extract washed with water, dried over anhydrous sodium sulfate and concentrated in vacuo to a viscous syrup.

*Preparation of 3-carbobenzoxy-6-methyl-$\Delta^6$-desoxymorphine*

The crude 3-carbobenzoxy-6-methyl-dihydromorphine obtained above was dissolved in 100 ml. of absolute chloroform and 2 ml. of thionyl chloride was added. The mixture was refluxed overnight. The chloroform solution was then poured onto crushed ice and the pH of the resulting mixture was adjusted to 9 with potassium hydroxide. The mixture was then extracted with chloroform and the chloroform extract concentrated in vacuo to yield 3-carbobenzoxy-6-methyl-$\Delta^6$-desoxymorphine.

*Preparation of 6-methyl-$\Delta^6$-desoxymorphine*

The crude 3-carbobenzoxy-6-methyl-$\Delta^6$-desoxymorphine was dissolved in 50 ml. of 95% alcohol and one gram of potassium hydroxide and a small volume of water was added. After refluxing the solution for 30 minutes in a nitrogen atmosphere, the pH of the mixture was adjusted to 9. The alcohol was removed by evaporation in vacuo and the residual crude 6-methyl-$\Delta^6$-desoxymorphine was extracted into chloroform. The chloroform extract was dried and concentrated in vacuo. The residue was crystallized from 50 ml. of ethyl acetate to yield 0.4 grams of essentially pure 6-methyl-$\Delta^6$-desoxymorphine having a melting point of 225°–230° C.

EXAMPLE 7

*Preparation of 3-acetyl-6-methyl-dihydromorphine*

A mixture of 5 g. of 6-methyl-dihydromorphine, 50 ml. of dry pyridine and 3 ml. of acetic anhydride was prepared and allowed to stand overnight at room temperature. The product, 3-acetyl-6-methyl-dihydromorphine, was extracted into chloroform in the usual manner. The chloroform extract was dried, concentrated and the residual oil crystallized from ether to yield a pure product, 3-acetyl-6-methyl-dihydromorphine, having a melting point of 173° C., $\alpha_D^{25}$= —231° C. (1% absolute alcohol).

*Analysis.*—Calculated for $C_{20}H_{25}O_4N$ (343.4): C, 69.93; H, 7.34; N, 4.08. Found: C, 70.18; H, 7.65; N, 4.01.

*Preparation of 3-acetyl-6-methyl-$\Delta^6$-desoxymorphine*

A mixture was prepared of 0.5 g. of 3-acetyl-6-methyl-dihydromorphine, 0.5 ml. of thionyl chloride and 10 ml. of pyridine and allowed to stand at room temperature for 24 hours. The resulting brown solution was decomposed on ice, the pH adjusted to 8.5 with sodium bicarbonate and the mixture extracted with chloroform. The chloroform extract was water washed, dried and concentrated in vacuo to remove the chloroform. The concentrate, 0.25 g. of 3-acetyl-6-methyl-$\Delta^6$-desoxymorphine, was crystallized from ether to yield pure 3-acetyl-6-methyl-$\Delta^6$-desoxymorphine, having a melting point of 170° C., $\alpha_D^{25}$= —229° C. (1% absolute alcohol).

*Analysis.*—Calculated for $C_{20}H_{23}O_3N$: C, 73.82; H, 7.12; N, 4.31. Found: C, 73.76; H, 7.13; N, 3.92.

The 3-acetyl-6-methyl-$\Delta^6$-desoxymorphine hydrochloride melted at 285°–290° C.

*Preparation of 6-methyl-$\Delta^6$-desoxymorphine*

Approximately 200 mg. of 3-acetyl-6-methyl-$\Delta^6$-desoxymorphine was heated with 0.5 g. of potassium hydroxide in dilute alcohol for 30 minutes on a steambath. The mixture was adjusted to pH 9 and extracted with chloroform. The chloroform extract was concentrated in vacuo and the crude product recrystallized twice from ethyl acetate to yield pure 6-methyl-$\Delta^6$-desoxymorphine, having a melting point of 236°–237° C.

EXAMPLE 8

*Preparation of 3-carboethoxy-6-butyl-dihydromorphine*

Four and five-tenths grams of 6-butyl-dihydromorphine (which can be prepared as set forth hereinbelow) was dissolved in pyridine. To this mixture was added dropwise ethyl chlorocarbonate (with cooling). After standing overnight at room temperature, the solution was poured onto crushed ice and a small quantity of sodium bicarbonate solution was added. The mixture was extracted with chloroform, the extract washed with water, dried over anhydrous sodium sulfate and concentrated in vacuo to a viscous syrup. Trituration of the syrup with a small volume of ether induced crystallization of 3-carboethoxy-6-butyl-dihydromorphine.

*Preparation of 3-carboethoxy-6-butyl-$\Delta^6$-desoxymorphine*

Four grams of 3-carboethoxy-6-butyl-dihydromorphine was dissolved in absolute chloroform and 3 ml. of thionyl chloride was added dropwise. The solution was then refluxed for 15 hours at 65° C. The chloroform solution was poured onto crushed ice and the resulting solution was adjusted to pH 9 with potassium hydroxide. The mixture was then extracted with chloroform and the chloroform extract concentrated in vacuo to yield 3-carboethoxy-6-butyl-$\Delta^6$-desoxymorphine.

*Preparation of 6-butyl-$\Delta^6$-desoxymorphine*

The crude 3-carboethoxy-6-butyl-$\Delta^6$-desoxymorphine was dissolved in a solution of 3 grams of sodium hydroxide in 70 ml. of 50% alcohol and containing a trace of sodium bisulfite. After refluxing the solution under a nitrogen atmosphere, the pH of the mixture was adjusted to 9, the alcohol was removed by evaporation in vacuo and the residual crude 6-butyl-$\Delta^6$-desoxymorphine was extracted into chloroform. The chloroform extract was dried and concentrated in vacuo. The residue was crystallized from ethyl acetate to yield 6-butyl-$\Delta^6$-desoxymorphine, having a melting point of 167°–169° C., $\alpha_D^{25}$ —215° C. (1% absolute alcohol).

Analysis of a sample dried in vacuo indicated solvation. Hence, a small portion was sublimed at 180° 1 mm.

*Analysis.*—Calculated for $C_{21}H_{27}O_2N$ (325.4): C, 77.50; H, 8.36; N, 4.30. Found: C, 77.59; H, 8.40; N, 4.56.

The 6-butyl-dihydromorphine utilized as a starting material in this example was prepared as follows:

Two-tenths of a mole of n-butyl-lithium was reacted with 17.1 grams (0.06 mole) of dihydromorphine at 0° C. The oily residue of 6-butyl-dihydromorphine slowly crystallized and after washing with acetone, melted at 175° C. The yield was 4.5 grams. Recrystallization did not raise the melting point. The analytical sample was sublimed in vacuo $[\alpha]_D^{25}$ —150° C. (1% absolute alcohol).

Modifications may be made in carrying out the present invention without departing from the spirit and scope thereof and the invention is to be limited only by the appended claims.

What is claimed is:

1. The process which comprises reacting a compound of the formula—

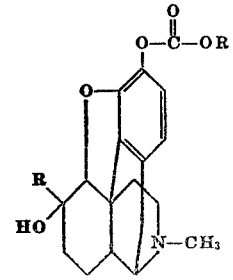

wherein R is a hydrocarbon radical having up to eight carbon atoms with a dehydrating agent to form a compound of the formula—

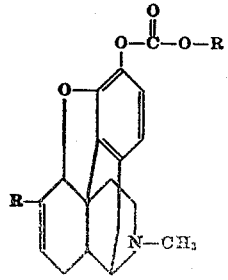

wherein R is as above.

2. The process which comprises reacting 3-carbomethoxy-6-methyl-dihydromorphine with thionyl chloride to form 3-carbomethoxy-6-methyl-$\Delta^6$-desoxymorphine.

3. The process which comprises reacting 3-carboethoxy-6-methyl-dihydromorphine with thionyl chloride to form 3-carboethoxy-6-methyl-$\Delta^6$-desoxymorphine.

4. The process which comprises reacting 3-carboethoxy-6-ethyl-dihydromorphine with thionyl chloride to form 3-carboethoxy-6-ethyl-Δ⁶-desoxymorphine.

5. The process which comprises reacting 3-carboethoxy-6-phenyl-dihydromorphine with thionyl chloride to form 3-carboethoxy-6-phenyl-Δ⁶-desoxymorphine.

6. The process which comprises reacting 3-carbobenzoxy-6-methyl-dihydromorphine with thionyl chloride to form 3-carbobenzoxy-6-methyl-Δ⁶-desoxymorphine.

References Cited in the file of this patent

UNITED STATES PATENTS 2,694,068  Payne et al. _____ Nov. 9, 1954

OTHER REFERENCES

Wagner: Synthetic Organic Chemistry, Wiley, N. Y., 1953, pp. 488–489.

Small et al.: J. Org. Chem., vol. 12, pp. 284–292 (1947).